(12) United States Patent
Gonzalez

(10) Patent No.: US 10,747,426 B2
(45) Date of Patent: Aug. 18, 2020

(54) SOFTWARE FOR KEYBOARD-LESS TYPING BASED UPON GESTURES

(71) Applicant: Marcos Lara Gonzalez, New York, NY (US)

(72) Inventor: Marcos Lara Gonzalez, New York, NY (US)

(73) Assignee: TYPYN, INC., New York, NY (US)

( * ) Notice: Subject to any disclaimer, the term of this patent is extended or adjusted under 35 U.S.C. 154(b) by 527 days.

(21) Appl. No.: 14/840,816

(22) Filed: Aug. 31, 2015

(65) Prior Publication Data

US 2016/0062647 A1 Mar. 3, 2016

Related U.S. Application Data

(60) Provisional application No. 62/044,412, filed on Sep. 1, 2014.

(51) Int. Cl.
*G06F 3/0488* (2013.01)

(52) U.S. Cl.
CPC ...... *G06F 3/04886* (2013.01); *G06F 3/04883* (2013.01); *G06F 2203/04808* (2013.01)

(58) Field of Classification Search
CPC .. G06F 3/018; G06F 3/04886; G06F 3/04895; G06F 3/04883; G06F 2203/04808
See application file for complete search history.

(56) References Cited

U.S. PATENT DOCUMENTS

| | | | | |
|---|---|---|---|---|
| 6,031,469 A | * | 2/2000 | Dodd | G06F 3/0219 |
| | | | | 341/20 |
| 8,754,864 B2 | * | 6/2014 | Paul | G06F 3/04883 |
| | | | | 345/173 |
| 2008/0042979 A1 | * | 2/2008 | Nikbin | G06F 3/0233 |
| | | | | 345/168 |
| 2010/0020020 A1 | * | 1/2010 | Chen | G06F 3/0233 |
| | | | | 345/173 |
| 2010/0083111 A1 | * | 4/2010 | de los Reyes | G06F 3/0482 |
| | | | | 715/702 |

(Continued)

OTHER PUBLICATIONS

Cho, "Input Device and Method for Inputting Character" Translation of Korean Application KR10-2012-0035925A*, Oct. 16, 2013, pp. 1-41.*

*Primary Examiner* — Ryan F Pitaro
(74) *Attorney, Agent, or Firm* — Norton Rose Fulbright US LLP

(57) ABSTRACT

Ergonomic keyboard-less typing may be used to replace traditional typing on a computer keyboard. The user may use an alternative user interface device, such as a smart phone, a tablet, or a wearable device, to make character selections. One of a plurality of user contact types may be received from an input interface, to provide a first indication of the character inputs the user would like to select. A display menu, generated at least in part based on the contact type received, may then present a plurality of gesture types, and one or more characters corresponding to each of the plurality of gesture types. A second indication of one of the plurality of gesture types may be received at the input interface. A selection of one or more characters may then be displayed based on the received first indication and the received second indication.

20 Claims, 13 Drawing Sheets

| FINGERS IN CONTACT WITH SCREEN | ASSIGNED CHARACTER | |
|---|---|---|
| | | 402 |
| 2 LEFT FINGER | A-D | 404 |
| 2 RIGHT FINGER | E-H | 406 |
| 3 LEFT FINGER | I-L | 408 |
| 3 RIGHT FINGER | M-P | 410 |
| 4 LEFT FINGER | Q-T | 412 |
| 4 RIGHT FINGER | U-Z | |

(56) References Cited

U.S. PATENT DOCUMENTS

| | | | |
|---|---|---|---|
| 2010/0277350 A1* | 11/2010 | Wu | H03M 11/22 341/22 |
| 2010/0293500 A1* | 11/2010 | Cragun | G06F 3/0485 715/784 |
| 2011/0175816 A1* | 7/2011 | Shin | G06F 3/04883 345/168 |
| 2011/0241909 A1* | 10/2011 | Griffin | H03M 11/22 341/22 |
| 2011/0302519 A1* | 12/2011 | Fleizach | G06F 3/03547 715/773 |
| 2012/0206382 A1* | 8/2012 | Kusano | G06F 3/0236 345/173 |
| 2012/0216152 A1* | 8/2012 | Li | G06F 3/0482 715/863 |
| 2012/0268389 A1* | 10/2012 | Yaron | G06F 3/0233 345/173 |
| 2013/0027434 A1* | 1/2013 | Paul | G06F 3/04883 345/660 |
| 2013/0033447 A1* | 2/2013 | Cho | G06F 3/018 345/173 |
| 2013/0074011 A1* | 3/2013 | Nakamura | G06F 1/1616 715/854 |
| 2013/0215037 A1* | 8/2013 | Mao | G06F 3/041 345/168 |
| 2014/0019904 A1* | 1/2014 | Martinoli | G06F 3/0234 715/773 |
| 2014/0157180 A1* | 6/2014 | Aono | G06F 3/04886 715/773 |
| 2014/0298237 A1* | 10/2014 | Galu, Jr. | G06F 3/04883 715/773 |
| 2014/0298266 A1* | 10/2014 | Lapp | G06F 3/04883 715/835 |
| 2015/0040056 A1* | 2/2015 | Cho | G06F 3/018 715/773 |
| 2015/0301741 A1* | 10/2015 | Nagaraju | G06F 3/04886 715/773 |
| 2016/0005150 A1* | 1/2016 | Ghassabian | G06F 3/0488 345/654 |
| 2016/0041965 A1* | 2/2016 | Ghassabian | G06F 3/005 715/261 |
| 2017/0068321 A1* | 3/2017 | Kuo | G06F 3/017 |
| 2017/0228123 A1* | 8/2017 | Ghassabian | G06F 3/0488 |
| 2018/0321841 A1* | 11/2018 | Lapp | G06F 3/04886 |

* cited by examiner

| # OF FINGERS IN CONTACT WITH SCREEN | ASSIGNED CHARACTERS |
|---|---|
| 1 | A-G |
| 2 | H-N |
| 3 | O-U |
| 4 | V-Z |

FIG. 4A

| FINGERS IN CONTACT WITH SCREEN | ASSIGNED CHARACTER |
|---|---|
| 2 LEFT FINGER | A-D |
| 2 RIGHT FINGER | E-H |
| 3 LEFT FINGER | I-L |
| 3 RIGHT FINGER | M-P |
| 4 LEFT FINGER | Q-T |
| 4 RIGHT FINGER | U-Z |

FIG. 4B

SOFTWARE FOR KEYBOARD-LESS TYPING BASED UPON GESTURES

CROSS-REFERENCE TO RELATED APPLICATIONS

This application claims the benefit of priority of U.S. Provisional Patent Application No. 62/044,412 to Marc Lara filed on Sep. 1, 2014 and entitled "Systems and Methods for Ergonomic Keyboardless Typing," which is incorporated by reference herein.

FIELD OF THE DISCLOSURE

The instant disclosure relates to a user interface for electronic data entry. More specifically, this disclosure relates to using alternative user interface devices as an ergonomic alternative to traditional computer keyboards.

BACKGROUND

The most common, traditional interfaces for electronic data entry include keyboards and mice. These tools often require users to stay in a physical position that can be difficult to sustain for long periods of time. FIG. 1 is an example of a traditional computer keyboard used in accordance with the prior art. The computing system 100, with user input and output interfaces is shown. A traditional computer keyboard 104, the input interface, is located in close proximity to the display device 102, the output interface. The user would need to be in a seated position to utilize the computing system set up shown in FIG. 1.

A growing body of scientific studies cites that typing on traditional computer keyboards, in a seated position, for many hours can have harmful repercussions to user health. Current mobile device data entry systems, which can be used in a non-seated position, still necessitate movements of the hands and neck, which increase bodily strain and reduce vigilance of the external environment. Some replacements for traditional keyboards include ergonomic keyboards, which include shapes that are better adapted to the human body. Still other solutions attempt to replace the keyboard, such as with special purpose gloves allow the wearer to make combinations of gestures for gaming and can even be used for typing. However, such solutions have several limitations that prevent them from being widely adopted.

First, a standard keyboard has 70+ characters that require 70+ keystrokes to reproduce them. The training required to learn the 70+ keystrokes often takes several semesters of class work or many years of experience. However, the process of using the standard keyboard is eased by labels for each character. If an untrained user wants to type a particular character, the user just looks for the labeled key on the keyboard, and knows that a single stroke will invoke that character on the display screen. Many of the alternatives to standard keyboard do not offer a similar option for untrained users to identify characters for input.

Additionally with prior keyboard replacements, even if the user knows that actions need to be done to select a character, these moves may be too hard to perform sustainably, possibly causing a higher physical strain than the one imposed by the traditional keyboard. Thus, these keyboard alternatives are not appropriate for all users, particularly those with disabling injuries.

Further, the habit of using a keyboard is widely engrained in most digital users. Thus, teaching a new input method, particularly those with no labels for identifying characters, is challenging and met with resistance from a user.

Although some limitations are described above, there are many limitations regarding the use of conventional keyboards that can be addressed by substitute input devices.

SUMMARY

The disadvantages and limitations described above, and others, can be overcome, and ergonomic keyboard-less typing may be achieved by using an alternative user interface device, such as a smart phone, a tablet, or a wrist watch, or wearable to make character selections. In certain embodiments, the input manner may be through different arrangement of keys than the arrangement presented in a QWERTY-style keyboard, though some embodiments may allow a QWERTY-style keyboard equivalent. One of a plurality of user contact types may be received from an input interface of the user interface device, to provide a first indication of the character inputs the user would like to select. A display menu, generated at least in part based on the contact type received, may then present a plurality of gesture types, and one or more characters corresponding to each of the plurality of gesture types. A second indication of one of the plurality of gesture types may be received at the input interface. A selection of one or more characters may then be displayed based on the received first indication and the received second indication.

Some of the disadvantages of prior keyboard replacements are overcome by the embodiments disclosed herein. For example, in some embodiments, an alternative way is provided through a user interface to remind users about what action invokes each character with ease comparable to the traditional keyboard. As another example, certain embodiments provide movements and gestures for selecting characters that the body can perform naturally without stress, such as the ones used to play music instruments, like the piano or the guitar. Some embodiments allow for a programmable set of gestures or contacts, such that the data input system may be customized for a particular user's conditions or disabilities. Further, the input interface of existing user devices may be used to implement certain embodiments of the keyboard replacement described herein. The use of existing devices can facilitate adoption of new data input systems, rather than requiring the user to buy a new device. Systems operating similar to the described methods and devices herein may be useful, for example, in hospitals to allow permanently or temporarily disabled patients provide feedback to their caregivers or communicate on the Internet. Another example use for the described methods and devices may be with a wearable that detects finger and/or wrist movement (such as a wristband) and another wearable (such as a glass) that acts as a display interface, which will allow people who are bedridden, walking or jogging to easily type.

According to one embodiment, a method may include receiving a first indication of one of a plurality of contact types received at an input interface. The method may also include generating at a display device a menu presenting a plurality of gesture types and one or more characters corresponding to each of the plurality of gesture types based, at least in part, on the received first indication. The method may further include receiving a second indication of one of the plurality of gesture types received at the input interface. The method may also include displaying selection of one or more characters based on the received first indication and the received second indication.

According to another embodiment, a computer program product may include a non-transitory computer readable medium comprising instructions which, when executed by a processor of a computing system, cause the processor to perform the steps of receiving a first indication of one of a plurality of contact types received at an input interface. The medium may also include instructions which, when executed by the processor, cause the processor to perform the steps of generating at a display device a menu presenting a plurality of gesture types and one or more characters corresponding to each of the plurality of gesture types based, at least in part, on the received first indication. The medium may further include instructions which, when executed by the processor, cause the processor to perform the steps of receiving a second indication of one of the plurality of gesture types received at the input interface. The medium may also include instructions which, when executed by the processor, cause the processor to perform the steps of displaying selection of one or more characters based on the received first indication and the received second indication.

According to a yet another embodiment, an apparatus may include a memory, and a processor coupled to the memory. The processor may be configured to execute the steps of receiving a first indication of one of a plurality of contact types received at an input interface. The processor may also be configured to execute the steps of generating at a display device a menu presenting a plurality of gesture types and one or more characters corresponding to each of the plurality of gesture types based, at least in part, on the received first indication. The processor may further be configured to execute the steps of receiving a second indication of one of the plurality of gesture types received at the input interface. The processor may also be configured to execute the steps of displaying selection of one or more characters based on the received first indication and the received second indication.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 4A is a table of contact types and corresponding character inputs, according to one embodiment of the disclosure.

FIG. 4B is an alternative table of contact types and corresponding character inputs, according to one embodiment of the disclosure.

DETAILED DESCRIPTION

Figure 1:
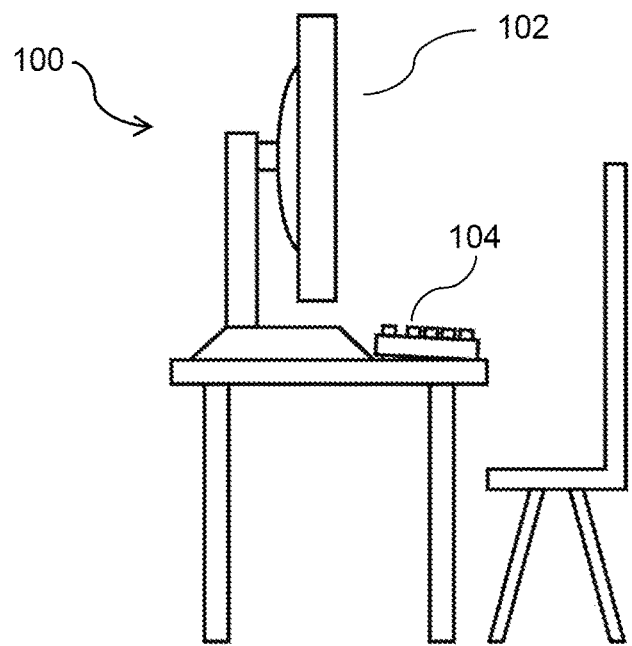
FIG. 1 is an example of a traditional computer keyboard used in accordance with the prior art.
Figure 2:
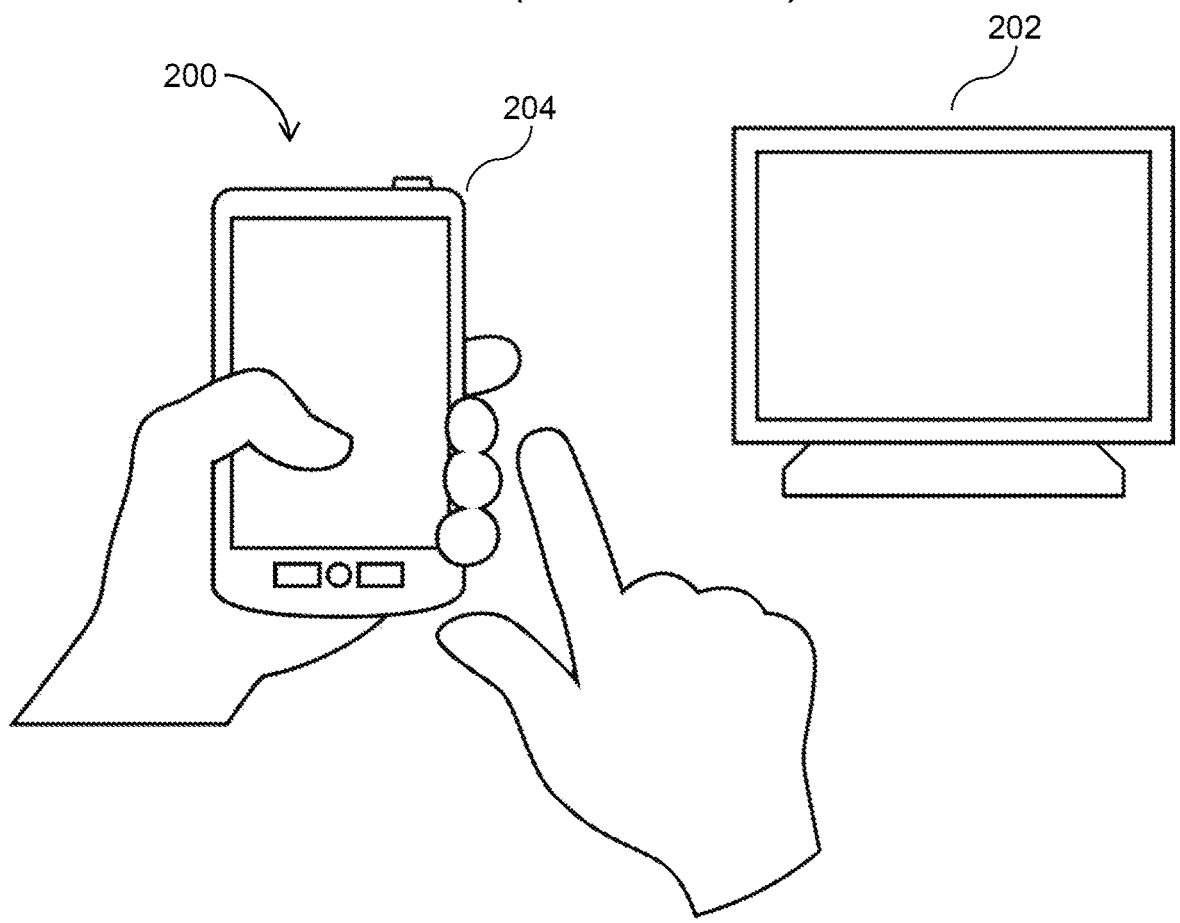
FIG. 2 is an example of the components used for ergonomic keyboard-less typing, according to one embodiment of the disclosure.

FIG. 2 is an example of the components 200 used for ergonomic keyboard-less typing, according to one embodiment of the disclosure. A first component is an alternative user interface device 204, which may be a mobile phone, a tablet, a wrist watch, a keyboard touchpad, a wearable (glove, glasses), or another device with an input interface. For example, when the device 204 is a smart phone the input interface may be a capacitive touch screen or an accelerometer of the phone. With the capacitive touch screen, the user may make gestures with their hand on the touch screen that can be interpreted as a character selection. A second component is a display device 202, which may be a computer monitor, a television, a projector screen, a touch screen, a wearable (e.g. glasses, lenses), or another output device. In most embodiments, the input interface is decoupled from the output device. The alternative user interface device 204 may be wireless, such that the device 204 is physically detached from any other computing component including the display device 202. User input may be received at the user interface device 204 and transmitted to another electronic device operating the display device 202. In another embodiment, input to the user interface device 204 may be used in a software application on the user interface device 204. For example, digital glasses could be used to capture eye movement and also to display the menu of characters to select with such movement.

The user interface device 204 may include software for interpreting gestures made by the user on the touch screen. That software may be configured for a user by assigning characteristics of the user's gesture as different criteria that when combined result in the selection of a character. For example, a user may use a contact type assigning a number of fingers in contact with the screen as a first screening criteria for selecting a range of characters. That user may then use a gesture type as a second screening criteria to select an individual character from the range of characters selected by the number of fingers. An application executing on the user interface device 204 may be configured prior to data input to associate the permutations of possible values for the first and second criteria with individual characters.

Figure 3:
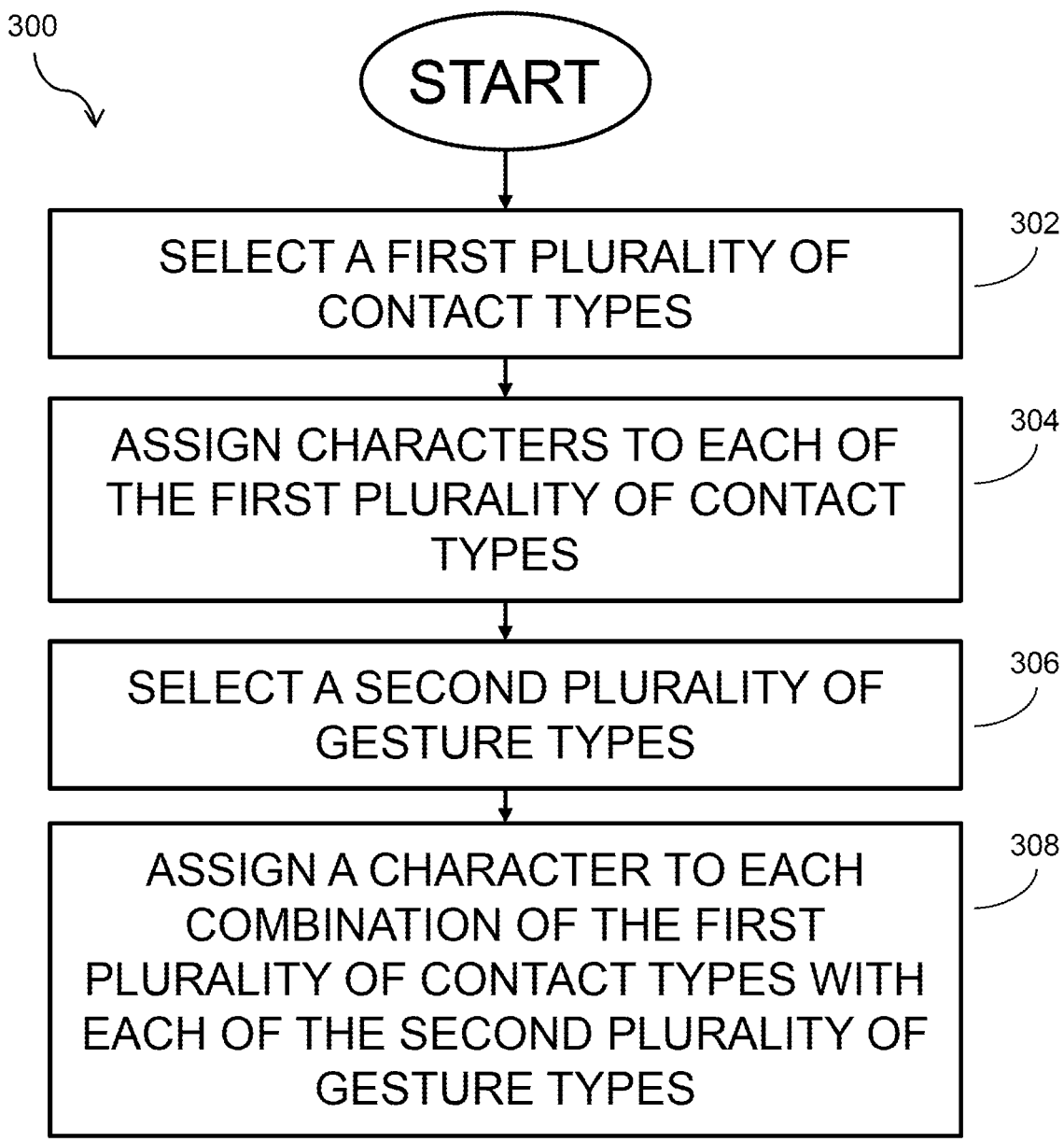
FIG. 3 is a flow chart for configuring typing software, according to one embodiment of the disclosure.

When the first and second criteria are contact type and gesture type, respectively, the software for the user interface device may be configured as described in the flow chart of FIG. 3. FIG. 3 is a flow chart for configuring typing software, according to one embodiment of the disclosure. A method 300 may begin at block 302 with selecting, by a processor, a plurality of contact types. The plurality of contact types may include, for example, one figure, two fingers, three fingers, and four fingers. At block 304, the method may include assigning, by a processor, characters to each of the plurality of contact types.

One embodiment for assignment of contact types created by executing blocks 302 and 304 is shown in FIG. 4A. FIG. 4A is a table of contact types and corresponding character inputs, according to one embodiment of the disclosure. The left hand column includes a plurality of contact types. For example, the contact type may be 1, 2, 3, or 4 finger(s) in contact with the user interface device screen or touchpad. Corresponding to each contact type are assigned character ranges 402, 404, 406, and 408. For example, for the contact type of 1 finger in contact with the screen or touchpad, the assigned characters are A-G 402.

Another embodiment for assignment of contact types created by executing blocks 302 and 304 is shown in FIG. 4B. FIG. 4B is an alternative table of contact types and corresponding character inputs, according to one embodiment of the disclosure. In this embodiment, the contact types include 2 left fingers, 2 right fingers, 3 left fingers, 3 right fingers, 4 left fingers, and 4 right fingers in contact with the user interface device screen or touchpad. Corresponding character ranges 410, 412, 414, 416, 418, and 420 are assigned to each contact type. For example, for the contact type of 2 left fingers, characters A-D 410 are assigned.

Referring back to FIG. 3, at block 306, the method may include selecting, by a processor, a plurality of gesture types. The gesture types may be, for example, a swipe up, a swipe down, a swipe left, a swipe right, a swipe to the top-left corner, a swipe to the top-right corner, a swipe to the bottom-left corner, and a swipe to the bottom-right corner. At block 308, the method may include assigning, by a processor, a character to each combination of the plurality of contact types with each of the plurality of gesture types. For example, a swipe up may select a first character of a range assigned to a contact type, and a swipe down may select a second character of the range assigned to a the contact type. In one embodiment, software on the device 204 may generate a plurality of menus based on the character assignments corresponding to each contact type and gesture type selected and assigned at blocks 302, 304, 306, and 308. In other embodiments, a user may infer the mapping of characters without needing to view each of the menus. In some cases, user input speed may be increased by not displaying a menu for each additional character.

For each of blocks 302, 304, 306, and 308, the steps of selecting and assigning may include the processor of the device 204 actively selecting and assigning, or receiving an indication to select and assign. For example, the processor may receive selections and assignments from a user configuring the device 204. In another example, the processor may receive an indication of selections and assignments from a remote source.

Figure 5:
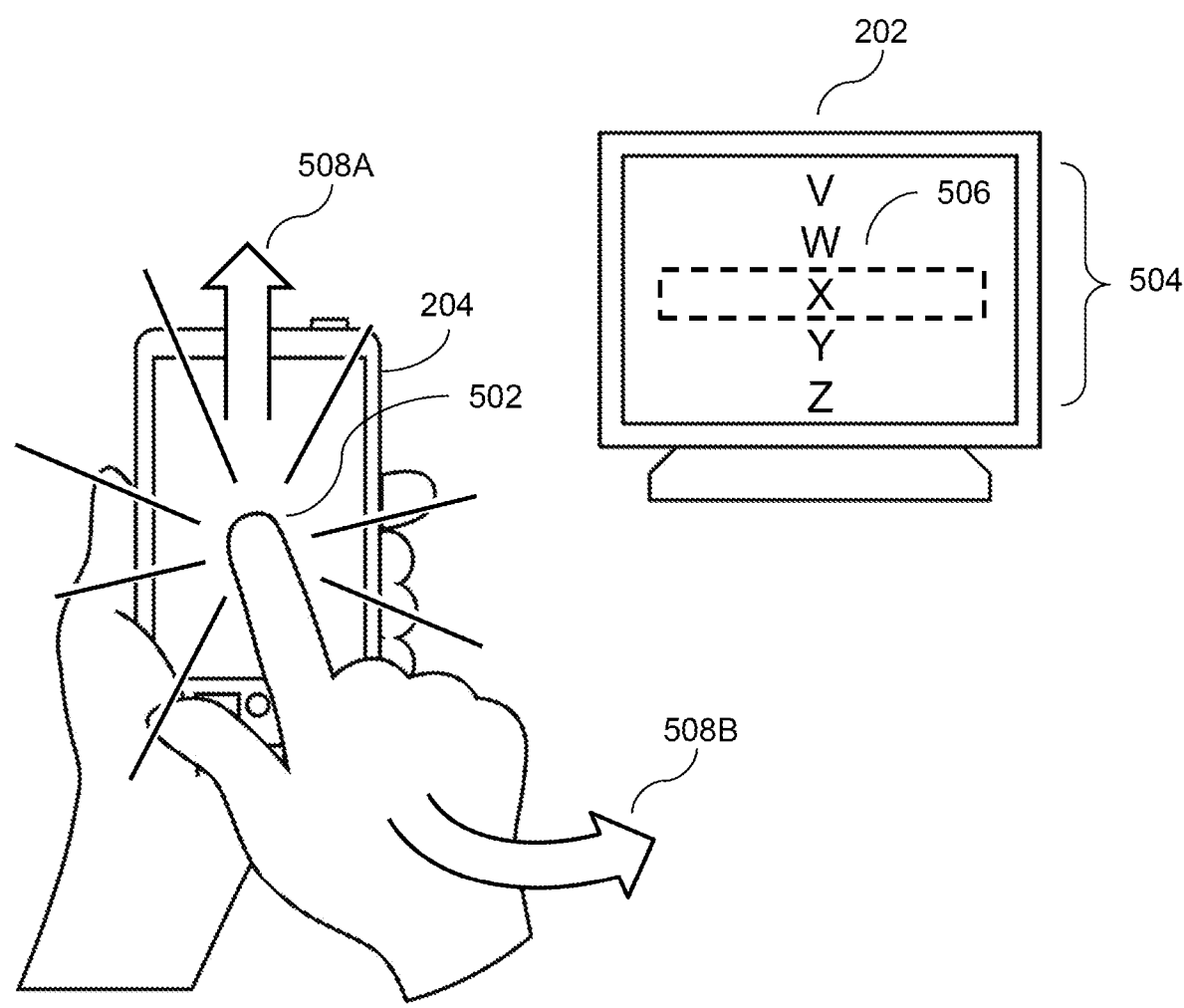
FIG. 5 is an example of using ergonomic keyboard-less typing to select character inputs, according to one embodiment of the disclosure.

After the device 204 is configured, a user may select characters for input through the device 204 as an alternate to traditional keyboards. FIG. 5 is an example of using ergonomic keyboard-less typing to select character inputs, according to one embodiment of the disclosure. After a user makes contact 502 with the device 204, the display device 202 may show a display menu 504 with several characters in a list available for selection, with a selection cursor 506 hovering over a single character. The selection cursor may be any indication of a selected character, such as a box outline or highlighting. The selection cursor may also take alternative forms of feedback such as vibration or sounds, such as for visually-impaired users. In an alternative embodiment, the cursor can be fixed and characters can be moved in or outside the selection cursor zone using contact or gesture types. The characters shown on the menu 504 may be the range of characters assigned to the contact type corresponding to user contact 502. By using the user interface device 204, the user can then make a gesture 508A or 508B in contact 502 with the user interface device 204 screen or touchpad to move the selection cursor 506 and select one of the characters available for selection on the display menu 504. The user may first contact 502 the screen with a particular contact type, such as one of the contact types listed in the tables in FIGS. 4A and 4B, to invoke a display menu 504 with the desired range of characters, corresponding to the contact type. Although not shown, prior to the user making contact 502 with the device 204, a menu may be displayed on the screen 202 indicating the different contact types available and the assigned character ranges for each of the contact types. Such a menu may contain the information displayed in the tables of FIGS. 4A and 4B.

With the user's finger(s) in contact 502 with the user interface device 204 screen or touchpad, the user may then move their finger(s) in contact 502 with the screen or touchpad straight upward 508A or straight downward 508B on the user interface device 204 screen or touchpad to move the selection cursor 506 upward or downward respectively on the display menu 504. For example, if the selection cursor 506 is hovering over the letter "x" in FIG. 5, the user can move their finger(s) straight upward 508A to move the selection cursor 506 to select the letter "w." The user can then move their finger(s) upward 508A further to move the selection cursor 506 to select the letter "v." Additionally, if the selection cursor 506 is hovering over the letter "x" in FIG. 5, the user can move their finger(s) downward 508B to move the selection cursor 506 to select the letter "y." The user can then move their finger(s) downward 508B further to move the selection cursor 506 to select the letter "z." Sometimes, hovering over will be enough to select a character. In other examples, once the character is selected on 202, the user can release the finger or make and additional gesture to confirm typing of the character.

Although a linear menu is illustrated in the operation of FIG. 5, other menus may be displayed corresponding to different assigned gesture types for selecting a character from an assigned range of characters. For example, rather than the linear up and down gesture type of FIG. 5, a directional gesture type may be configured on the device 204 through the configuration method of FIG. 3. Contact and gesture types that can invoke menus on the display encompass virtually take any type of shape that can be done repeatedly without stress, including but not limited: rectangular, matrix, circular, parallelogram, or tridimensional shapes.

Movements encompass virtually all types that adapt to a particular body part and can be done repeatedly without stress. These include, but are not limited to: up, down, diagonal, forward, backward, tap, release, slide, lateral, rotations, abductions, adductions, or circular movements. Input interfaces may be able to interpret signals two or three dimensions, and to detect variations such pressing/clicking the touch surface or rolling a ball.

Figure 6:
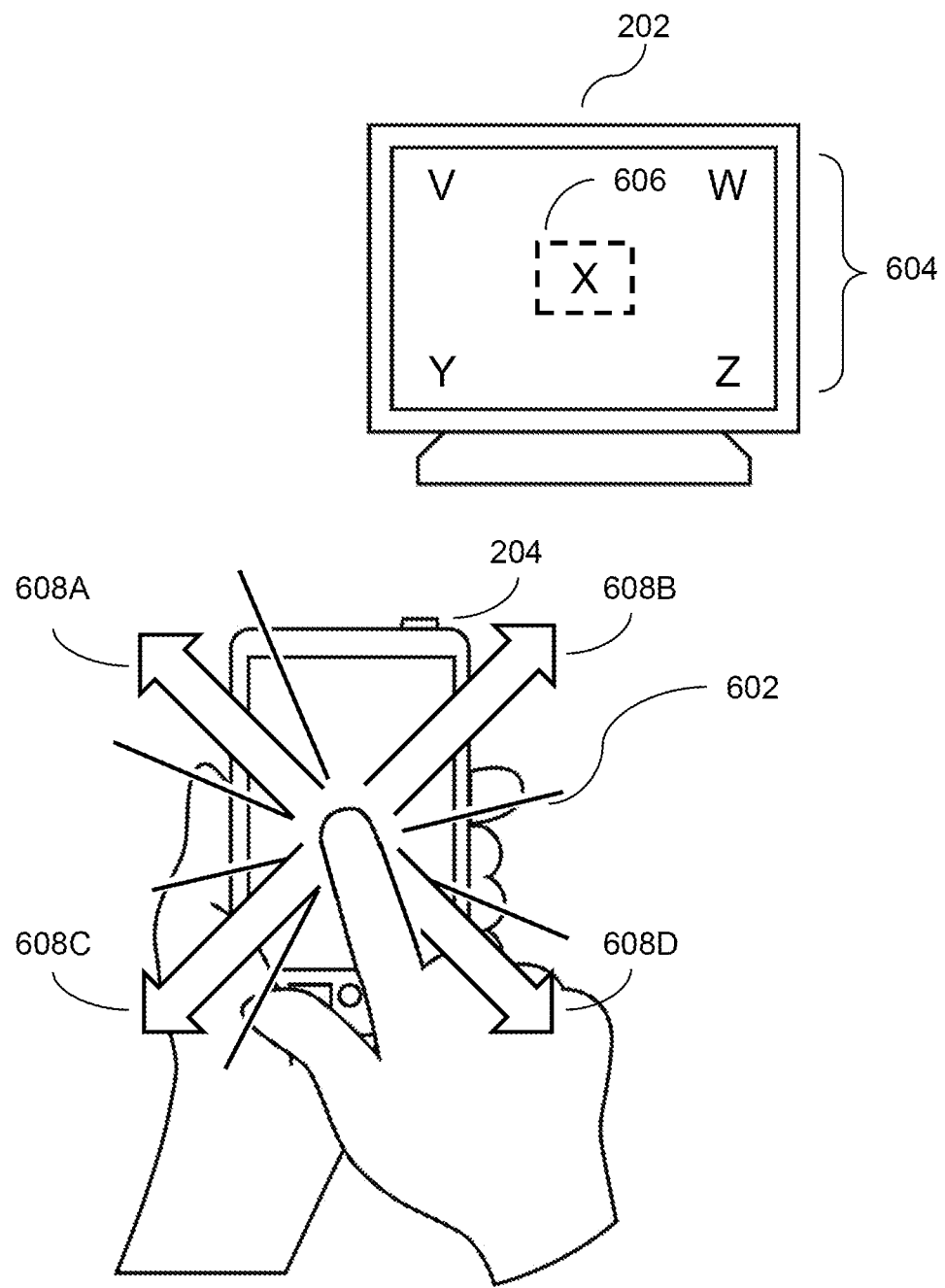
FIG. 6 is an alternative example of using ergonomic keyboard-less typing to select character inputs, according to one embodiment of the disclosure.

Operation of the device 204 according to a directional gesture type is shown in FIG. 6. FIG. 6 is an alternative example of using ergonomic keyboard-less typing to select character inputs, according to one embodiment of the disclosure. The display device 202 shows a display menu 604 with five characters available for selection, with one character in the middle of the display menu 604, and one character in each of the four corners of the display menu 604, and with a selection cursor 606 hovering over the character in the middle of the display menu 604. With the user interface device 204, the user can make a gesture type 608A, 608B, 608C, 608D in contact 602 with the user interface device 204 screen or touchpad to move the selection cursor 606 and select one of the characters available for selection on the display menu 604. The user may first contact 602 the screen with a particular contact type, such as one of the contact types listed in the tables in FIGS. 4A and 4B, to invoke the display menu 604 with the desired range of characters, corresponding to the contact type.

With the user's finger(s) in contact 602 with the user interface device 204 screen or touchpad, the user can move their finger(s) in contact 602 with the screen or touchpad toward the upper left corner 608A of the user interface device 204 screen or touchpad, toward the upper right corner 608B of the user interface device 204 screen or touchpad, toward the lower left corner 608C of the user interface device 204 screen or touchpad, or toward the lower right corner 608D of the user interface device 204 screen or touchpad. For example, if the selection cursor 606 is hovering over the letter "x" in FIG. 6, the user can move their finger(s) toward the upper left corner 608A to move the selection cursor 606 to the letter "v." If the selection cursor 606 is hovering over the letter "x" in FIG. 6, the user can move their finger(s) toward the upper right corner 608B to move the selection cursor 606 to the letter "w." If the selection cursor 606 is hovering over the letter "x" in FIG. 6, the user can move their finger(s) toward the lower left corner 608C to move the selection cursor 606 to the letter "y." If the selection cursor 606 is hovering over the letter "x" in FIG. 6, the user can move their finger(s) toward the lower right corner 608D to move the selection cursor 606 to the letter "z." After the user has moved the selection cursor 606 to the desired character, the user may release from the contact 602 with the screen to confirm selection of the letter. A user may quickly learn the associations of various permutations of contact types and gesture types with individual characters, such that some users may be able to input data through the device 204 at rates as rapid as 50-100 words per minute.

The menus 504 and 604 of FIGS. 5 and 6, respectively, are illustrated on the display device 202. However, in other embodiments, the menus 504 and 604 may be generated on the device 204. Further, in some embodiments, the menus 504 and 604 may be generated on the device 204 and the display device 202. In yet other embodiments, the system may operate in a "silent" mode, in which the menus 504 and 604 are not displayed. Such a "silent" mode may be appropriate for a user that is already skilled with using the configured device 204.

Figure 7A:
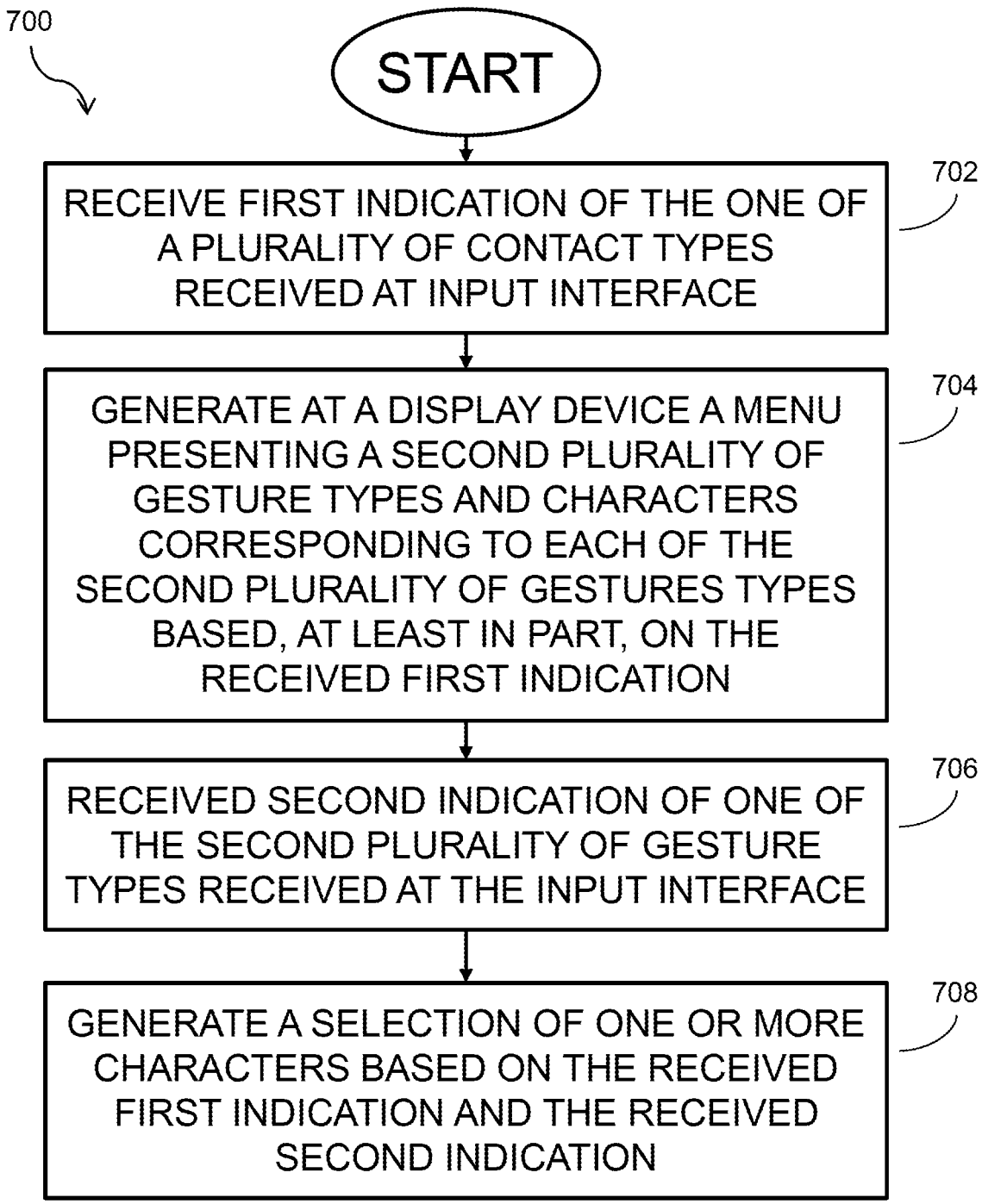
FIG. 7A is a flow chart for receiving user input on configured typing software, according to one embodiment of the disclosure.

The user input entered into the device 204 may be processed according to the flow chart shown in FIG. 7A. FIG. 7A is a flow chart for receiving user input on configured typing software, according to one embodiment of the disclosure. A method 700 may begin at block 702 with receiving a first indication of one of a plurality of contact types received at an input interface on a user interface device. Prior to block 702, an "at rest" menu may be presented to the user to provide an indication to the user that the device is ready to receive input from the user and/or provide initial instructions on how the use can begin providing input. The contact types may be the contact types listed in the tables in FIGS. 4A and 4B. At block 704, the method may include generating at a display device a menu presenting a plurality of gesture types and one or more characters corresponding to each of the plurality of gesture types based, at least in part, on the received first indication. The display menu may be, for example, the display menu 504 from FIG. 5 or the display menu 604 from FIG. 6. The characters available on the display menu may be determined based on the contact type received at block 702, such as the character selections corresponding to each contact type in the tables in FIGS. 4A and 4B. The plurality of gesture types may include gesture types 508A and 508B from FIG. 5 or gesture types 608A, 608B, 608C, and 608D from FIG. 6.

At block 706, the method may include receiving a second indication of one of the plurality of gesture types received at the input interface. At block 708, the method may include generating a selection of one or more characters based, at least in part, on the received first indication and the received second indication. For example, the received first indication and the received second indication may be matched to an assigned one or more characters. After the selection of the character is generated, the one or more characters may be displayed on a screen or otherwise provided as input to another application. For example, once a user has made a contact type on the user interface device screen or touchpad, the corresponding character input options may appear on a display menu on the display device. Then, when the user makes a gesture to select one of the character input options from the display menu, the selected character may be displayed on the display device. Multiple characters may be selected by a user by providing certain gestures after contact is made. For example, swiping up to the upper left to select the character 'v,' but then without removing their finger from the screen the user may also swipe to the upper right to append the character 'w' to the selected 'v.'

Gestures such as a brief hold, tapping with another finger, or a lateral move (to select a character and continue typing in the same row), may be enabled to facilitate typing a character string. For example, if a person needs to type "abecedary" and letters a,b,c,d,e are in the same column, using a column like in FIG. 5, lateral moves facilitate multiple selection. The person could: Select "a", make a lateral move to type "a" without releasing the finger; keep moving the index down to select "b", make a lateral move to type "b" without releasing it; keep going down to select "e", make a later move to type "e", and so forth to type "abeceda" without lifting the finger. Alternatively, it could make 7 independent taps/movements and releases to type "abeceda" as well.

Also, the user may be able to invoke and type characters that are not on the current menu by making contacts or gestures that acts as modifiers or scroll keys. This allows to change and/or expand the menu options. Such contacts or gesture, for example, can show capital letters, numbers, special characters, functions, or simply letters that were either not displayed or directly available under the current menu. Such menus, characters, and modifiers, can be changed and customized to contact and gestures types that fit the user's preference.

After one or more characters are selected by repeating the process of method 700, the user may switch operation of the user interface to operate as a trackpad for the computer being controlled. Note that in this particular embodiment, the user is capable of both typing all keyboard characters and using a trackpad using a single hand of its choice, left or right, according to personal preference.

Figure 7B:
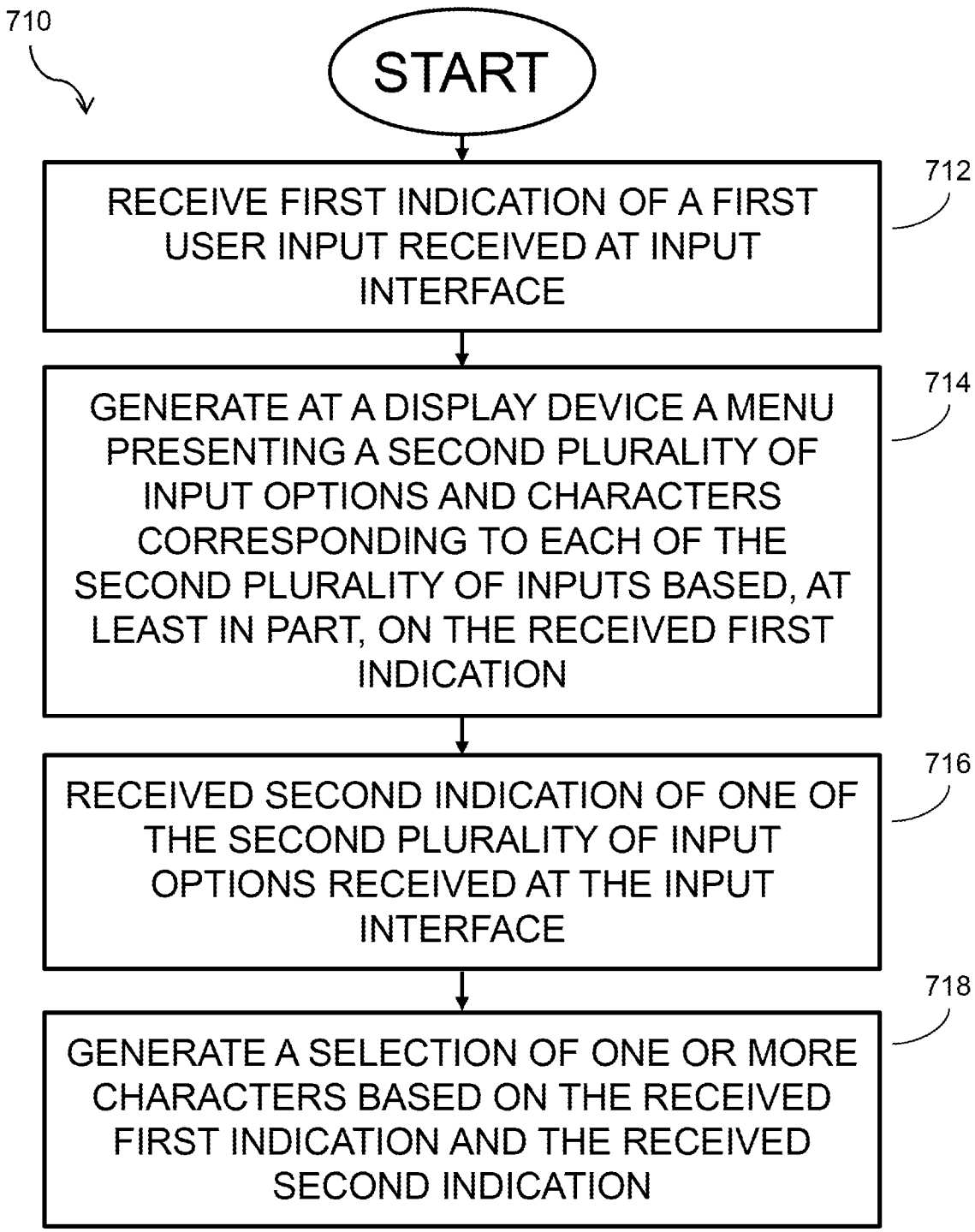
FIG. 7B is an alternative flow chart for receiving user input on configured typing software, according to one embodiment of the disclosure.
Figure 8:
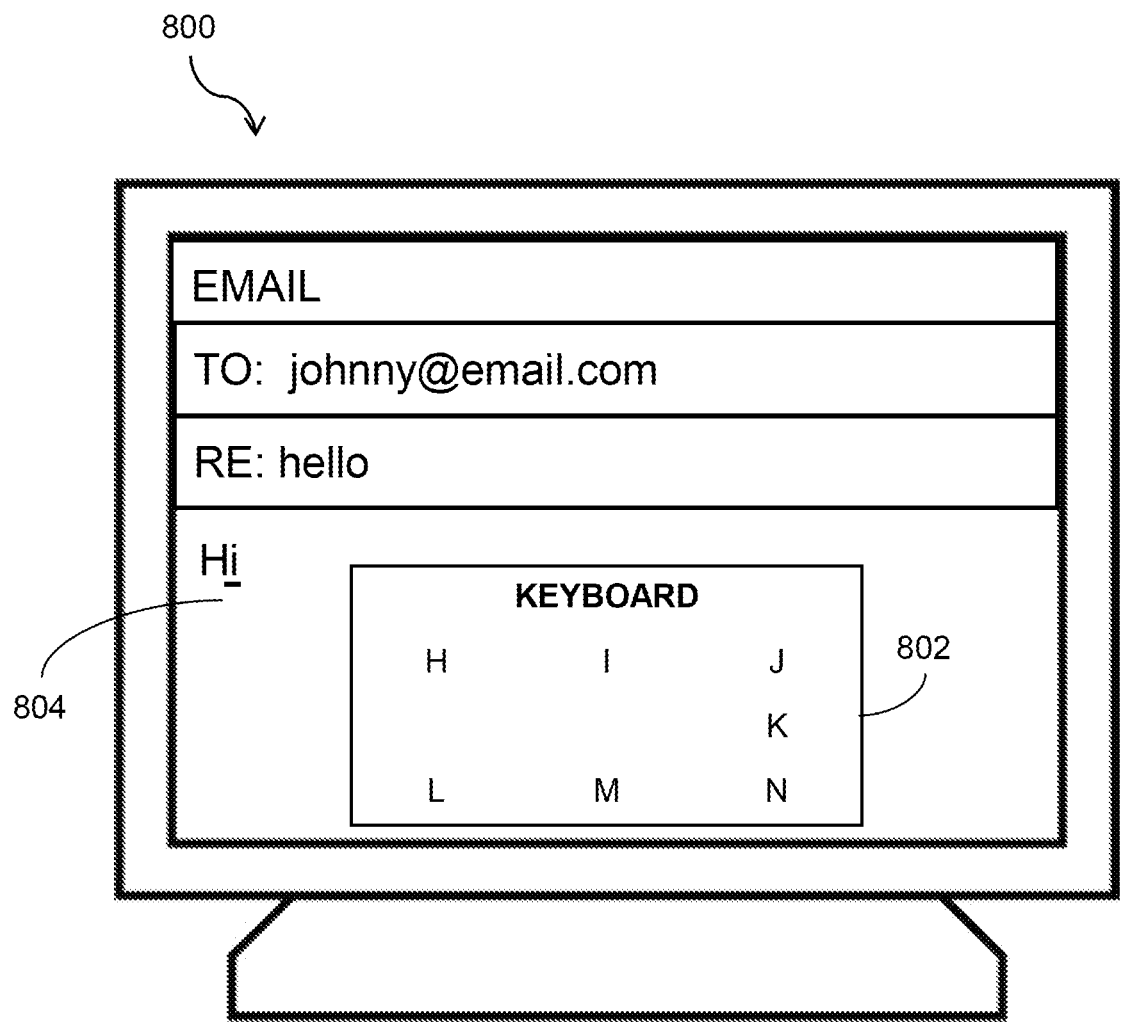
FIG. 8 is an example of inputting characters into a computer application using ergonomic keyboard-less typing, according to one embodiment of the disclosure.

The display may show the selected character entered into a software or web-based computer application, as shown in FIG. 8. In one example, the generated characters by the method of FIG. 7A may be used to input characters for typing an email message. FIG. 8 is an example of inputting characters into a computer application using ergonomic keyboard-less typing, according to one embodiment of the disclosure. For example, the character inputs may be entered as described above with FIGS. 7A and 7B into an email 800. The display menu 802 with input characters is shown on the display device. The selected character input 804, in this case "I," is entered into the email 800. The keyboard 802 may execute as, for example, a keyboard plug-in to a software piece, a keyboard input system for an operating system such as the GOOGLE ANDROID or APPLE IOS operating systems. Although the display of FIG. 8 is shown similar to display device 202 of FIG. 2, the character input may be entered onto any screen, including the user interface device 204 of FIG. 2.

Referring back to the flow chart of FIG. 7A, the illustrated steps may all or partially be performed on either the user interface device 204, a processor coupled to the display device 202, or another device not shown. For example, the device 204 may include a capacitive touch screen that receives user input for the contact type and the gesture. Signals from the capacitive touch screen may be processed by a processor of the device 204 and a final character selection transmitted to another device, such as a personal computer, for display on the display device 202. Some or all of the steps of the method 700 of FIG. 7A may be performed by the personal computer. For example, in one embodiment the user interface device 204 may be a device with significantly limited processing resources, such as a "dummy" device. In this embodiment, the device 204 may include a capacitive touch screen that generates signals corresponding to the contact type and gesture type and those signals are conveyed back to the personal computer. The personal computer receives those signals as a first indication and a second indication and displays an appropriate menu and generates the character selection.

Further, the character input is not limited to only one device. Multiple touch screen interfaces, or other interfaces, may be used to improve speed of character input. Although such input in this manner can increase complexity and the user learning curve, the improved speed can be advantageous for users often operating a device with these input techniques. One example configuration for two-handed input is shown in Table 1. In this input technique no gestures may be required. For example, a character may be selected only based on a number of left fingers placed on a first input device and a number of right fingers placed on a second input device. Thus, as shown in Table 1, a user may make contact with one right finger and one left finger to select 'A' and then make contact with two right fingers and three left fingers to select 'H.' The user may continue in this manner inputting additional characters.

TABLE 1

An example mapping of characters to user gestures on two input devices, where columns reflect a number of right fingers contacting one input device and rows reflect a number of left fingers contacting another input device. Such user interfaces may be controlled by a sole user or be shared for users to collaborate in the edition of a particular document.

|   | 1 | 2 | 3 | 4 | 5 |
|---|---|---|---|---|---|
| 1 | A | F | K | P | U |
| 2 | B | G | L | Q | V |
| 3 | C | H | M | R | W |
| 4 | D | I | N | S | X |
| 5 | E | J | O | T | Y |

The character selection process illustrated in FIG. 7A may be applied to other manners of input, such as voice, mediated reality, wearables with sensors of any type, including but not limited to wristband, gloves, watches, or rings. Sensors can be mechanic and/or electrical, or any other type of sensors that capture impulses from the body and/or brain (directly or from other body parts); and/or combinations of the above.

For example, the contact type may be broadened to a first input type and the gesture type may be broadened to a second input type. In one embodiment, when the user interface device is a glove, the first input type may be holding out a number of fingers from the hand in the glove and the second input type may be moving the hand in the glove in an up, down, left, or right motion. In another embodiment, when the user interface is an accelerometer or other motion-sensing device in the device 204, the first input type may be making a circle motion, a square motion, or a FIG. 8 motion with the device 204 in the user's hand and the second input type may be flicking the device 204 up, down, left, or right.

A more general description for receiving input is described with reference to FIG. 7B. FIG. 7B is an alternative flow chart for receiving user input on configured typing software, according to one embodiment of the disclosure. A method 710 may begin at block 712 with receiving a first indication of one of a plurality of first inputs received at an input interface. At block 714, the method may include generating at a display device a menu presenting a plurality of second inputs and one or more characters corresponding to each of the plurality of second inputs based, at least in part, on the received first indication. At block 716, the method may include receiving a second indication of one of the plurality of second inputs received at the input interface. At block 718, the method may include generating a selection of one or more characters based, at least in part, on the received first indication and the received second indication. After the selection is generated, the character may be displayed or provided to an application for further processing.

Figure 9:
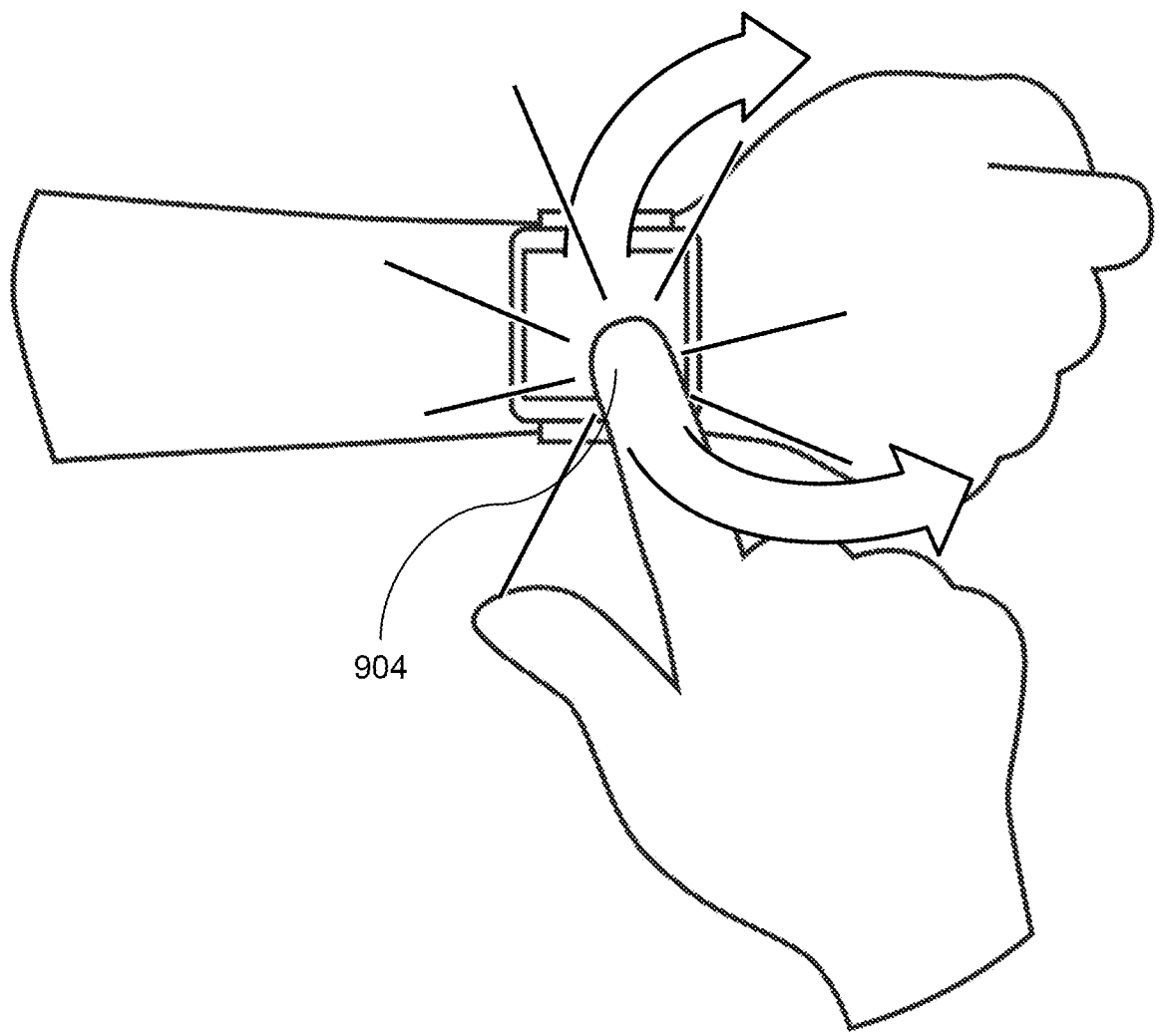
FIG. 9 is an example of using ergonomic keyboard-less typing on a wrist watch, according to one embodiment of the disclosure.
Figure 10:
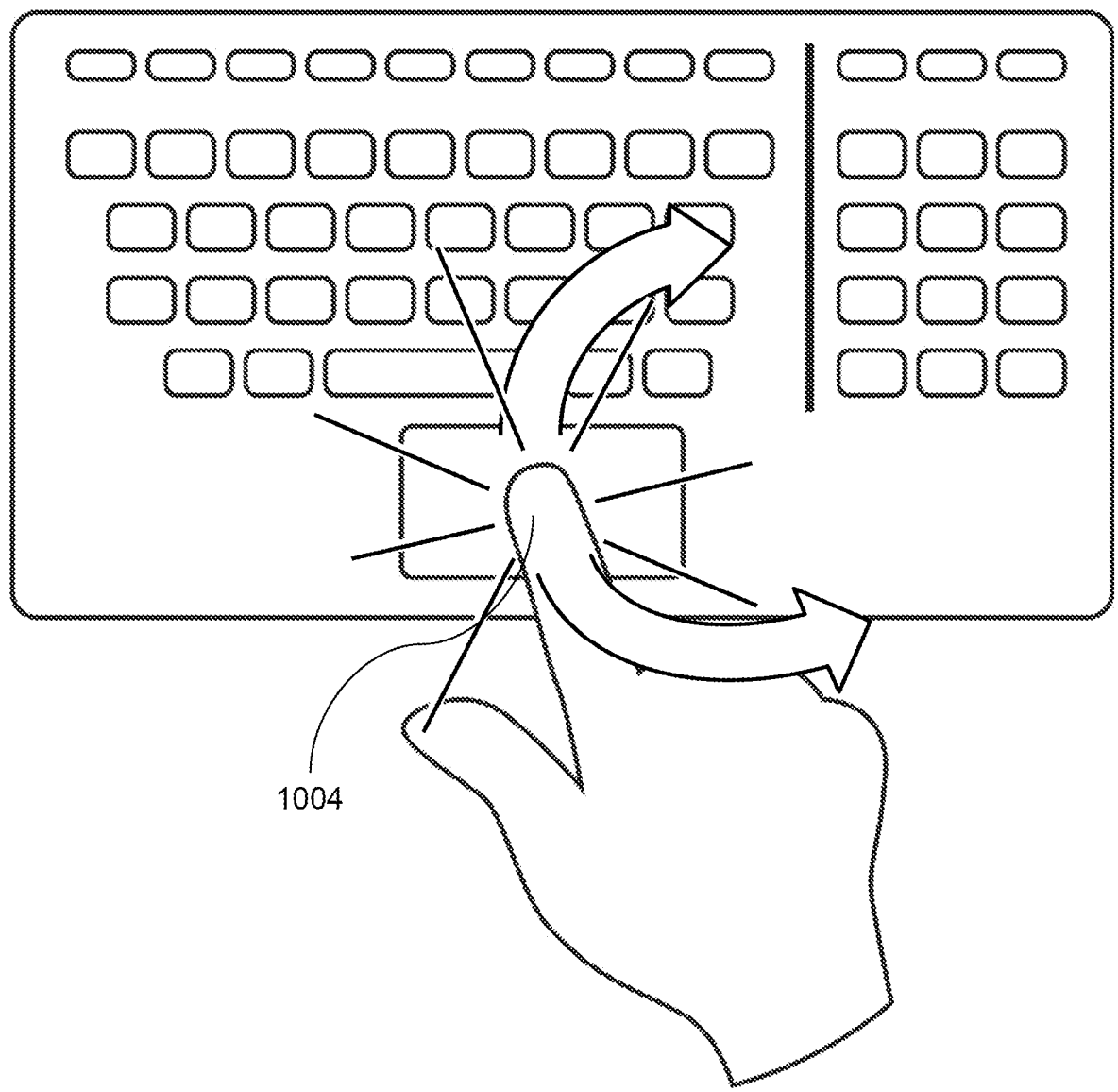
FIG. 10 is an example of using ergonomic keyboard-less typing on a traditional computer keyboard, according to one embodiment of the disclosure.

Although many embodiments are described with reference to a user interface device 204 being a smart phone, other electronic devices may receiving the various first and second inputs from a user. FIG. 9 is an example of using ergonomic keyboard-less typing on a wrist watch, according to one embodiment of the disclosure. Contact types and gestures types 904 as described above with FIGS. 7A and 7B may be made on the screen of a wrist watch. Additionally, FIG. 10 is an example of using ergonomic keyboard-less typing on a traditional computer keyboard, according to one embodiment of the disclosure. Contact types and gesture types 1004 as described above with FIGS. 7A and 7B may be made on the touchpad of the traditional keyboard.

Figure 11:
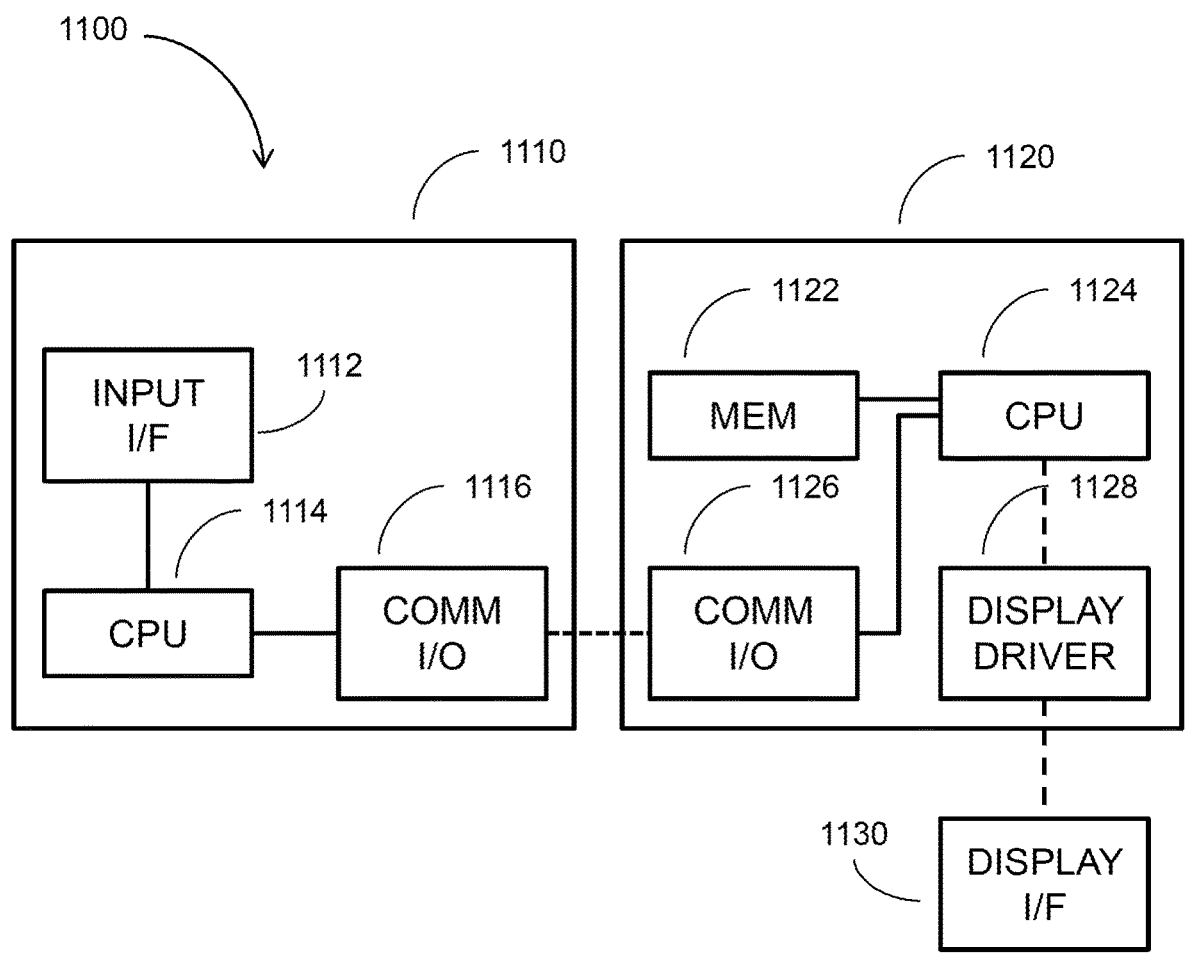
FIG. 11 is a block diagram illustrating a computer system for implementing embodiments of the disclosure, according to one embodiment of the disclosure.

The software and operations described above may be implemented on various hardware configurations. One hardware configuration is shown in FIG. 11. FIG. 11 is a block diagram illustrating a computer system 1100 for implementing embodiments of the disclosure, according to one embodiment of the disclosure. For example, the computer system 1100 may implement each of the embodiments illustrated in FIGS. 1-10. The computer system 1100, includes a user interface device 1110, a computer 1120, and a display device 1130.

The user interface device 1110, corresponding to one embodiment of the user interface device 204 of FIG. 2, may include a central processing unit ("CPU") 1114. The CPU 1114 may be coupled to an input interface ("I/F") 1112 and may also be coupled to a communications input/output ("I/O") adaptor 1116. The input interface 1112 may be, for example, a capacitive touch screen, an accelerometer, a camera, an active digitizer for operation with a stylus, an eye location detector, a brain stimulus detector, a wearable, and/or microphone. The communications I/O adapter 1116 may provide a physical interface to a network medium, either wired or wireless. For example, the I/O adapter 1116 may be an IEEE 802.11 ("WiFi") communications adapter, an IEEE 802.3 Ethernet communications adapter, a Bluetooth communications adapter, or another radio frequency (RF)-based communications device.

The I/O adapter 1116 provides communications from the user interface device 1110 to the computer 1120, such as to provide an indication of a received first input and second input or to provide an indication of a selected character. The computer 1120 may include a CPU 1124 that is coupled to a communications I/O adaptor 1126, a display driver 1128, and memory 1122. The user interface device CPU 1114 and the computer CPU 1124 may be a general purpose CPUs or microprocessors, graphics processing units ("GPU"), and/or microcontrollers. The present embodiments are not restricted by the architecture of the CPUs 1114 and 1124, so long as the CPUs 1114 and 1124, whether directly or indirectly, support the operations described herein. The CPUs 1114 and 1124 may execute the various logical instructions according to the present embodiments. The I/O adaptor 1116 and the I/O adaptor 1126 may share a common protocol to allow a user to interact with the computer 1120 using the user interface device 1110. The display driver 1128 in the computer 1120 may display a graphical user interface (GUI) associated with a software application like the input interface 1112 on a display interface device 1130, such as a computer monitor, television, projector screen, or touch screen. The display driver 1128 may be, for example, a graphics card containing a graphics processing unit (GPU), or an integrated GPU (iGPU) contained on a single die with the CPU 1124.

The applications of the present disclosure are not limited to the architecture of computer system 1100. Rather components of the computer system 1100, such as the device 1110, are provided as an example of one type of computing device that may be adapted to perform the functions described in FIGS. 1-10. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

Figure 12:
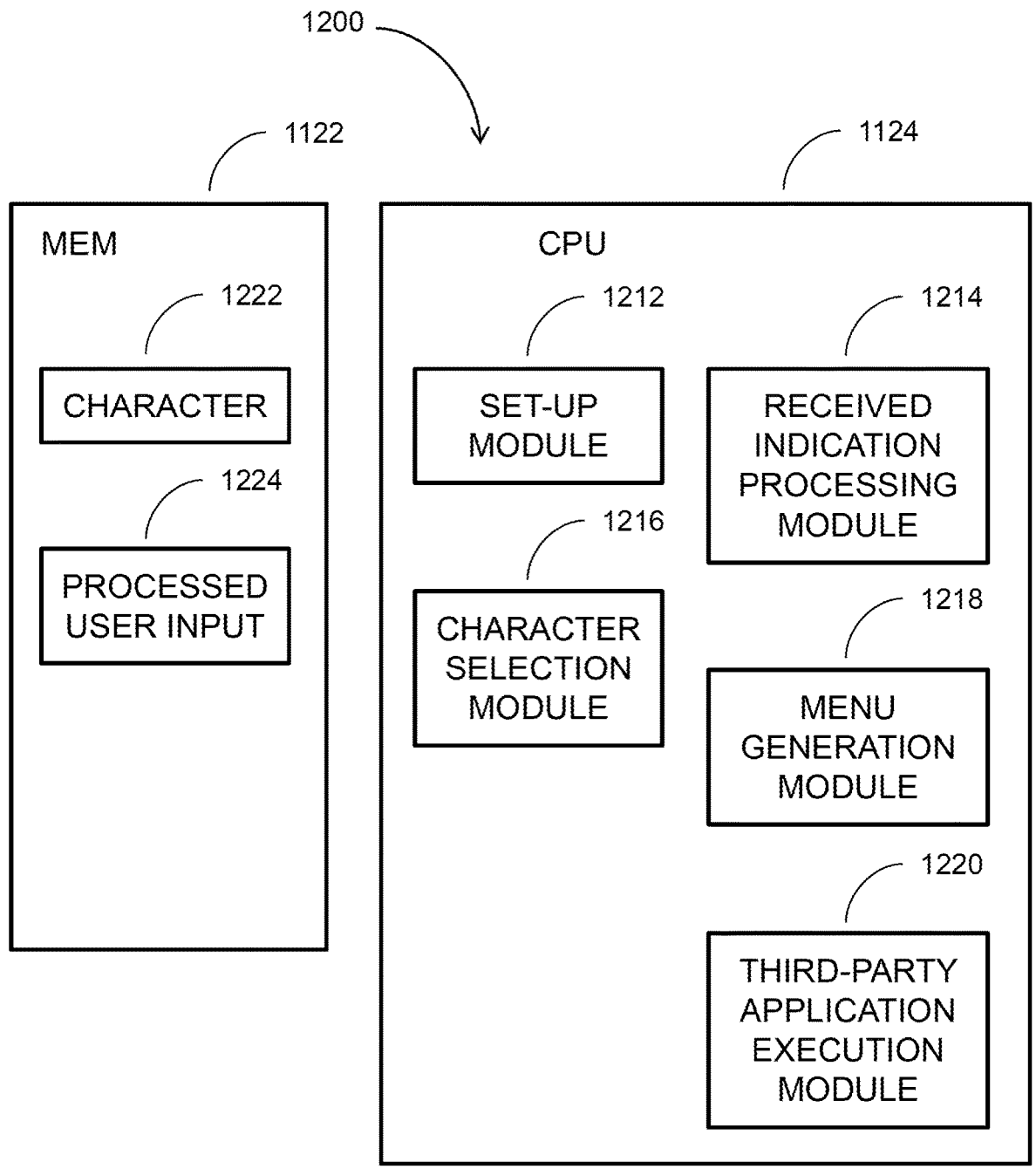
FIG. 12 is a block diagram illustrating the organization of typing software in a computer system, according to one embodiment of the disclosure.

FIG. 12 is a block diagram illustrating the organization of typing software 1200 in a computer system, according to one embodiment of the disclosure. The computer memory 1122 is coupled to the computer CPU 1124 and configured to store data that may be accessed by various modules executing on the CPU 1124 or other applications. In the computer memory 1122, character assignments 1222 and processed user input 1224 may be stored. The CPU 1124 may execute a set-up module 1212, a received indication processing module 1214, a character selection module 1216, a menu generation module 1218, and a third-party application execution module 1220. The set-up module 1212 may execute the configuration routine described with reference to FIG. 3 to generate and store the character assignments 1222 in the memory 1122. The received indication processing module 1214 may process signals generated by, for example, a capacitive touch screen. The processed signals may cause the menu generation module 1218 to generate a menu illustrated a range of characters for selection therefrom. The character selection module 1216 may then receive indications from the received indication processing module 1214 that are used to determine the character selected by the user. The selected character may be stored as processed user input 1224 in the memory 1122 and accessed by third-party application execution module 1220, such as to provide the characters to email software. The applications of the present disclosure are not limited to the architecture of the typing software 1200 disclosed in this embodiment.

Although certain embodiments of hardware are described above, the size or shape of the hardware may vary depending on the type of user interface it works with. The hardware can be an independent piece, or an interdependent one that can be easily attached, detached and/or rearranged around the device carrier by the user. For example, it could function as a smartphone cover and at the same time, perform one or several of the functions above. Attachment may be physical, magnetic, or of any other type allowed by current technology.

The hardware may also contain an entire or partial body or display interface. For example, the device may contain buttons that are not part of the touch screen per se, but that could partially contribute to managing it. In another example, the hardware is a device cover that has a touch screen enabled, in addition to the one of the consumer device (e.g. smartphone, tablet). Magnetic attachment may allow the piece of hardware to be placed outside (i.e. visibly), while the consumer device to which it attaches may be inside (i.e. invisible); or vice-versa. In one example, a person could carry a smartphone in its pocket, and the attachable hardware outside the pocket, adhered to invisible part (i.e. the cell phone) through a magnetic force. This would allow the user to type in positions other than sitting or horizontal, such as standing or walking.

Systems to identify fingers and/or guide movements may be used to facilitate typing. For example, the software application may be trained to detect the finger used directly (i.e. recognizing the finger or surrogate) or indirectly (e.g. creating physical and/or virtual areas in the body interface that correspond to certain fingers. Reference points in the form or hardware and/or software, may facilitate the recognition of the body part used and/or the area/s of the screen touched. For example, a mediated reality system may provide a virtual body interface.

The hardware may be a simple, non-electrical, piece that can be attached to the touch screen and guides or places the fingers in certain areas of it to enable easier and/or faster typing. For example, if the touch screen is not designed to differentiate the fingers used by the user, certain hardware could be used to guide the fingers or to generate an electric signal that reveals the finger used to the body interface.

In addition to the various hardware embodiments described above, hardware may be combined with currently used technologies to allow for faster typing. For example, the current invention could be combined with speech recognition, predictive text, sound, and/or vibrations that provides feedback to the user.

Further, hardware may be used to connect the input interface better to the body part for faster or more ergonomic typing in different positions. For example, the hardware could attach the body interface to some part of the arm, hand, or waist to place it in a location that is easy for the hand to access and/or touch accurately in various positions (walking, standing, etc.).

In certain embodiments, the hardware could also be used to produce certain indications of a character (e.g., braille) for both visually and non-visually impaired people to type more accurately on the touch screen. In another example, the hardware could reveal a position in the row/column that mimics the positions in the row/table on the display interface.

In certain embodiments, better connectivity and battery life may be obtained through uses of hardware including independent connectivity (e.g. BLUETOOTH) from the one used by the device and/or using a separate energy source from the one of the touch screen/device, so the user can type and still preserve its device (e.g. tablet, wearable, or smartphone) battery life.

If implemented in firmware and/or software, the functions described above, such as with respect to the flow charts of FIGS. 3, 7A, and 7B and the software modules of FIG. 12 may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically erasable programmable read-only memory (EEPROM), compact-disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, although English language characters are described throughout the illustrated embodiments, other languages or lists of scientific characters may be assigned to contact types and gesture types. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by at least one processor, a first indication of a gesture detected by an input interface of a first electronic device;
   generating, by the at least one processor, a selection of one or more characters corresponding to the detected gesture from a two-dimensional index of characters; and
   displaying the generated selection of characters on a second electronic device,
   wherein the first indication of the gesture comprises an indication of whether a right hand or a left hand was used to make the gesture, a number of fingers, and a direction of movement of one or more of the fingers,
   wherein the two-dimensional index of characters comprises a first dimension, comprising a plurality of combinations of a hand used to make a gesture and numbers of fingers, and a second dimension, comprising a plurality of directions of movement, in which each combination of a hand used to make a gesture and number of fingers, in the first dimension, and a direction of movement, in the second dimension, corresponds to at least one character, and
   wherein the second electronic device is paired to the first electronic device to display the generated selection of characters corresponding to the first indication of the gesture detected by the input interface of the first electronic device.

2. The method of claim 1, further comprising providing the generated selection to an application.

3. The method of claim 1, further comprising displaying, on a display, a table representing the two-dimensional index of characters including one or more combinations of a number of fingers and a direction of movement of one or more fingers and at least one character corresponding to each of the combinations.

4. The method of claim 1, in which a single gesture comprising a single direction of movement and a number of fingers corresponds to a single letter of the alphabet.

5. The method of claim 1, wherein the gesture further comprises an additional characteristic of the gesture detected by the input interface, and wherein the generation of the selection of one or more characters corresponding to the gesture is generated from the additional characteristic of the gesture, in addition to the two-dimensional index of characters.

6. The method of claim 1, further comprising selecting the two-dimensional index of characters from among a plurality of two-dimensional indexes of characters based, at least in part, on an additional characteristic of the gesture detected by the input interface.

7. The method of claim 1, wherein the indication of the gesture further comprises an indication of a type of at least one finger used to make the gesture.

8. The method of claim 1, wherein the indication of whether a right hand or left hand was used to make the gesture is based on at least one of: a configuration of the input interface and sensed characteristics of the gesture.

9. An apparatus, comprising:
a display device;
a memory; and
at least one processor coupled to the display device and the memory, wherein the at least one processor is configured to perform the steps of:
receiving a first indication of a gesture detected by an input interface of a first electronic device;
generating a selection of one or more characters corresponding to the detected gesture from a two-dimensional index of characters; and
causing the generated selection of characters to be displayed on the display device,
wherein the first indication of the gesture comprises an indication of whether a right hand or a left hand was used to make the gesture, a number of fingers, and a direction of movement of one or more of the fingers,
wherein the two-dimensional index of characters comprises a first dimension, comprising a plurality of combinations of a hand used to make a gesture and numbers of fingers, and a second dimension, comprising a plurality of directions of movement, in which each combination of a hand used to make a gesture and number of fingers, in the first dimension, and a direction of movement, in the second dimension, corresponds to at least one character, and
wherein the display device is paired to the first electronic device to display the generated selection of characters corresponding to the first indication of the gesture detected by the input interface of the first electronic device.

10. The apparatus of claim 9, in which the apparatus comprises at least one of: a mobile phone, a tablet, a wearable, and a keyboard touchpad.

11. The apparatus of claim 9, wherein the at least one processor is further configured to perform a step comprising providing the generated selection to an application.

12. The apparatus of claim 9, in which the at least one processor is further configured to perform a step comprising displaying, on the display, a table representing the two-dimensional index of characters including one or more combinations of a number of fingers and a direction of movement of one or more fingers and at least one character corresponding to each of the combinations.

13. The apparatus of claim 9, in which a single gesture comprising a single direction of movement and a number of fingers corresponds to a single letter of the alphabet.

14. The apparatus of claim 9, wherein the gesture further comprises an additional characteristic of the gesture detected by the input interface, and wherein the generation of the selection of one or more characters corresponding to the gesture is generated from the additional characteristic of the gesture, in addition to the two-dimensional index of characters.

15. The apparatus of claim 9, wherein the indication of whether a right hand or left hand was used to make the gesture is based on at least one of: a configuration of the input interface and sensed characteristics of the gesture.

16. A computer program product, comprising:
a non-transitory computer readable medium comprising code to perform the steps of:
receiving a first indication of a gesture detected by an input interface of a first electronic device;
generating a selection of one or more characters corresponding to the detected gesture from a two-dimensional index of characters; and
displaying the generated selection of characters on a second electronic device,
wherein the first indication of the gesture comprises an indication of whether a right hand or a left hand was used to make the gesture, a number of fingers, and a direction of movement of one or more of the fingers,
wherein the two-dimensional index of characters comprises a first dimension, comprising a plurality of combinations of a hand used to make a gesture and numbers of fingers, and a second dimension, comprising a plurality of directions of movement, in which each combination of a hand used to make a gesture and number of fingers, in the first dimension, and a direction of movement, in the second dimension, corresponds to at least one character, and
wherein the second electronic device is paired to the first electronic device to display the generated selection of characters corresponding to the first indication of the gesture detected by the input interface of the first electronic device.

17. The computer program product of claim 16, in which the medium further comprises code to perform a step comprising providing the selection of one or more characters to an application.

18. The computer program product of claim 16, in which the medium further comprises code to perform a step comprising displaying, on a display, a table representing the two-dimensional index of characters including one or more combinations of a number of fingers and a direction of movement of one or more fingers and at least one character corresponding to each of the combinations.

19. The computer program product of claim 16, wherein the indication of the gesture further comprises an indication of a type of at least one finger used to make the gesture.

20. The computer program product of claim 16, wherein the indication of whether a right hand or left hand was used to make the gesture is based on at least one of: a configuration of the input interface and sensed characteristics of the gesture.

* * * * *